DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 366

T879,006

PROCESS FOR THE FORMATION OF FIXED IMAGES

Peter John Hillson, 66 Dukes Ave., Chiswick, London W4, England; Michael Ridgway, Barleycombe, Trooper Road, Aldbury, Tring, Hertfordshire, England; and John Lawrence Frost, 23 Broadlands Ave., Chesham, Buckinghamshire, England

Filed Mar. 2, 1970, Ser. No. 15,969

**Int. Cl. G03c *5/24***

U.S. Cl. 96—48

No Drawing. 17 Pages Specification

Processes are described by which images produced by the disproportionation of certain metal compounds are made permanent by subjecting them to oxidative fixing. There is provided a method for fixing a metal image or pattern by treating the layer containing said metal image and a complimentary image-wise distribution of an undisproportionated compound of the metal, in which the metal is in a low equivalent state of oxidation, with an oxidizing agent which preferentially oxidizes the metal compound to form a compound which is readily soluble, whereby it is removed from the layer, leaving the metal image.